United States Patent
Kale et al.

(10) Patent No.: US 9,794,404 B2
(45) Date of Patent: Oct. 17, 2017

(54) UNIVERSAL CONTACT MANAGER

(75) Inventors: Mangesh Kale, Pune (IN); Anand Paithankar, Pune (IN)

(73) Assignee: Avaya Inc., Basking Ridge, NJ (US)

( * ) Notice: Subject to any disclaimer, the term of this patent is extended or adjusted under 35 U.S.C. 154(b) by 1525 days.

(21) Appl. No.: 12/687,758

(22) Filed: Jan. 14, 2010

(65) Prior Publication Data
US 2011/0170682 A1 Jul. 14, 2011

(51) Int. Cl.
*H04M 3/42* (2006.01)
*H04M 3/493* (2006.01)
*H04L 29/12* (2006.01)

(52) U.S. Cl.
CPC .... *H04M 3/4931* (2013.01); *H04L 29/12198* (2013.01); *H04L 61/1594* (2013.01); *H04M 2203/554* (2013.01)

(58) Field of Classification Search
CPC .......... H04L 29/12198; H04L 61/1594; H04M 3/4931; H04M 2203/554
USPC ................................ 709/248, 206, 217–219
See application file for complete search history.

(56) References Cited

U.S. PATENT DOCUMENTS

| | | | |
|---|---|---|---|
| 6,895,559 B2 | 5/2005 | Forder | |
| 7,164,934 B2 | 1/2007 | Malizia-Hoyt et al. | |
| 7,228,335 B2* | 6/2007 | Caughey | 709/206 |
| 2002/0049751 A1 | 4/2002 | Chen et al. | |
| 2002/0178003 A1* | 11/2002 | Gehrke et al. | 704/246 |
| 2007/0143397 A1* | 6/2007 | Guedalia et al. | 709/203 |
| 2008/0040485 A1* | 2/2008 | Glasgow | 709/227 |
| 2008/0205655 A1* | 8/2008 | Wilkins et al. | 380/279 |
| 2008/0222127 A1* | 9/2008 | Bergin | 707/5 |
| 2008/0307306 A1 | 12/2008 | Pettinati et al. | |
| 2009/0037523 A1* | 2/2009 | Kolke et al. | 709/203 |
| 2009/0128494 A1* | 5/2009 | Cherry | 345/169 |
| 2009/0209286 A1* | 8/2009 | Bentley et al. | 455/556.1 |
| 2009/0305730 A1* | 12/2009 | Herz et al. | 455/466 |
| 2010/0057643 A1* | 3/2010 | Yang | 706/11 |
| 2010/0119046 A1* | 5/2010 | Hoblit et al. | 379/88.03 |
| 2010/0150321 A1* | 6/2010 | Harris et al. | 379/88.02 |
| 2010/0151827 A1* | 6/2010 | Goyal et al. | 455/412.1 |
| 2010/0153459 A1* | 6/2010 | Sousa et al. | 707/797 |
| 2010/0268742 A1* | 10/2010 | Ring et al. | 707/792 |
| 2010/0290608 A1 | 11/2010 | Grover et al. | |
| 2010/0293543 A1 | 11/2010 | Erhart et al. | |
| 2011/0047511 A1* | 2/2011 | Essl et al. | 715/836 |

(Continued)

OTHER PUBLICATIONS

"Nortel Telephones Options Key and Directory Applications," Rice University, Jul. 30, 2009 [retrieved on May 27, 2014], 2 pages. Retrieved from: http://web.archive.org/web/20090730023546/http://www.rice.edu/it/telecom/norteloptions.html.

*Primary Examiner* — Abdullahi E Salad
(74) *Attorney, Agent, or Firm* — Sheridan Ross P.C.

(57) ABSTRACT

Systems and methods presented herein include a universal contact server. The universal contact server communicates with a universal contacts database. The universal contact server can retrieve contact information from all the communication devices associated with a use and store the contact information into the single universal contact database. With the contact information stored in a single location, the user can use any communication device to contact the contact server and retrieve the contact information. In this way, the centrally stored contact information, allows a user to easily locate any contact information the user desires.

20 Claims, 11 Drawing Sheets

(56) References Cited

U.S. PATENT DOCUMENTS

2011/0072492 A1    3/2011  Mohler et al.
2011/0130168 A1*  6/2011  Vendrow et al. .......... 455/556.1
2012/0317216 A1* 12/2012  Freedman .................... 709/206
2013/0191402 A1*  7/2013  Wilkins et al. ............... 707/752

* cited by examiner

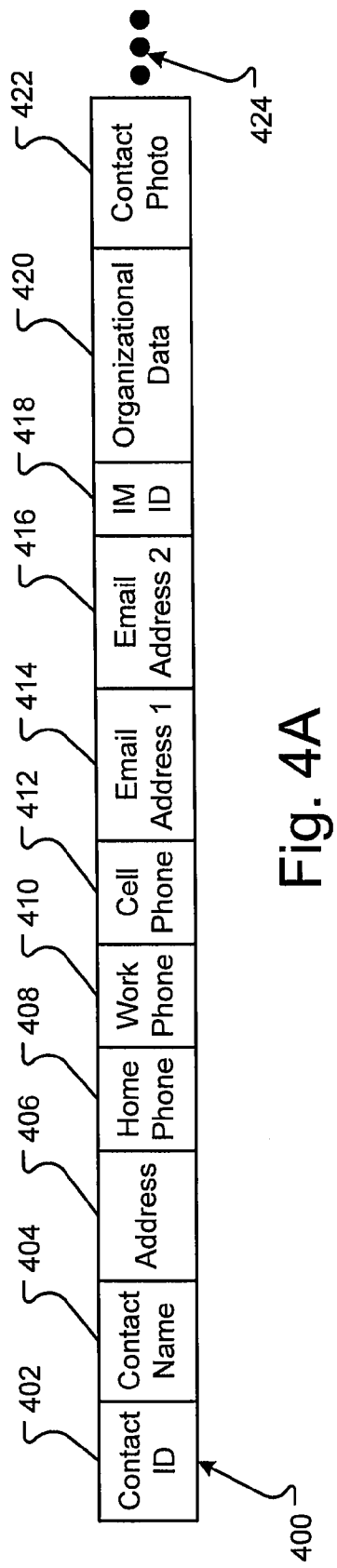
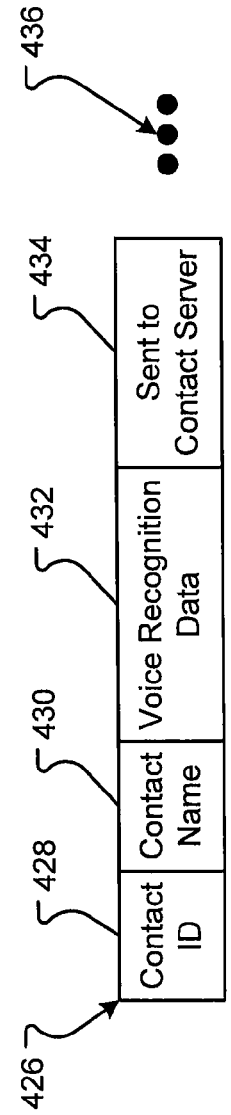
Fig. 4A
Fig. 4B

UNIVERSAL CONTACT MANAGER

BACKGROUND

Generally, there are many opportunities for people to communicate with each other through different means of communication. For instance, a single person might be able to communicate with other people using a cellular phone, email, instant messaging, or other communication devices. In order to communicate with people, many users store contact information for their contacts. However, with the various different devices, the contact information generally is stored in a distributed environment, where each communication device may store contact information only for portion of all the person's contacts. The distributed storage of contact information makes communication difficult because the person may not have the correct contact information in the communication device the person is currently using. Further problems can complicate the issue. For example, when a communication device fails or can no longer retrieve the contact information it once stored, the person may not be able to make the communication.

SUMMARY

It is with respect to the above issues and other problems that the embodiments presented herein were contemplated. Embodiments presented herein provide a system that includes a universal contact server. This universal contact server communicates with a universal contacts database. The universal contact server can retrieve contact information from all at a person's different communication devices and store the contact information into the single universal contacts database. With the contact information stored in a single location, the user can use any communication device to contact the contact server and retrieve contact information. In this way, the distributed environment described in the Background is changed, where all contacts are stored into a single location, allowing a user to easily locate any contact information which the user desires. In one embodiment, the person's different communication devices are all owned by the same person.

Embodiments of a method described herein download a thin client application to each communication device. The thin client application allows the user to retrieve contact information from that communication device and send the contact information to the contact server for storage. Further, the thin client can allow the user to interface with the communication device with a voice recognition system or some other system that allows the user to identify contact information. The thin client can send the identifying information to the contact server. In response to this information being received at the contact server, the contact server can send contact information back to the communication device to allow the user to communicate with the contact.

The universal contact server may have several interfaces to different communication devices. Any information received for a contact can be input into the universal contacts database. The universal contact server can segregate and organize the information such that personal contacts are stored in a personal contact area in the universal contacts database, and the business contacts can be stored into a separate area. Further, the contact server allows the user to identify and then provide contact information from the universal contacts database.

A contact can be any person or organization with which the user desires to communicate. Contact information can be any information that can be associated with the contact. Contact information can include phone numbers, addresses, email addresses, instant messaging identifiers, photos, contact name, contact identifiers, or other information that might be associated with the contact. A communication device may be a hardware device, such as a mobile phone, or may also be some type of software application, such as a thin client phone system that may be executed on a computer system.

The phrases "at least one", "one or more", and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more" and "at least one" can be used interchangeably herein. It is also to be noted that the terms "comprising", "including", and "having" can be used interchangeably.

The term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material".

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the invention is considered to include a tangible storage medium and prior art-recognized equivalents and successor media, in which the software implementations of the present invention are stored.

The terms "determine", "calculate" and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the invention is described in terms of exemplary embodiments, it should be appreciated that aspects of the invention can be separately claimed.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below.

BRIEF DESCRIPTION OF THE DRAWINGS

The present disclosure is described in conjunction with the appended figures;

FIGS. 4A and 4B are block diagrams that include embodiments of data structures that may be sent, stored, or received in the process of managing or organizing contacts;

In the appended figures, similar components and/or features may have the same reference label. Further, various components of the same type may be distinguished by following the reference label by a letter that distinguishes among the similar components. If only the first reference label is used in the specification, the description is applicable to any one of the similar components having the same first reference label irrespective of the second reference label.

DETAILED DESCRIPTION

The ensuing description provides embodiments only, and is not intended to limit the scope, applicability, or configuration of the invention. Rather, the ensuing description will provide those skilled in the art with an enabling description for implementing the embodiments. It should be understood that various changes may be made in the function and arrangement of elements, without departing from the spirit and scope of the appended claims.

Figure 1:
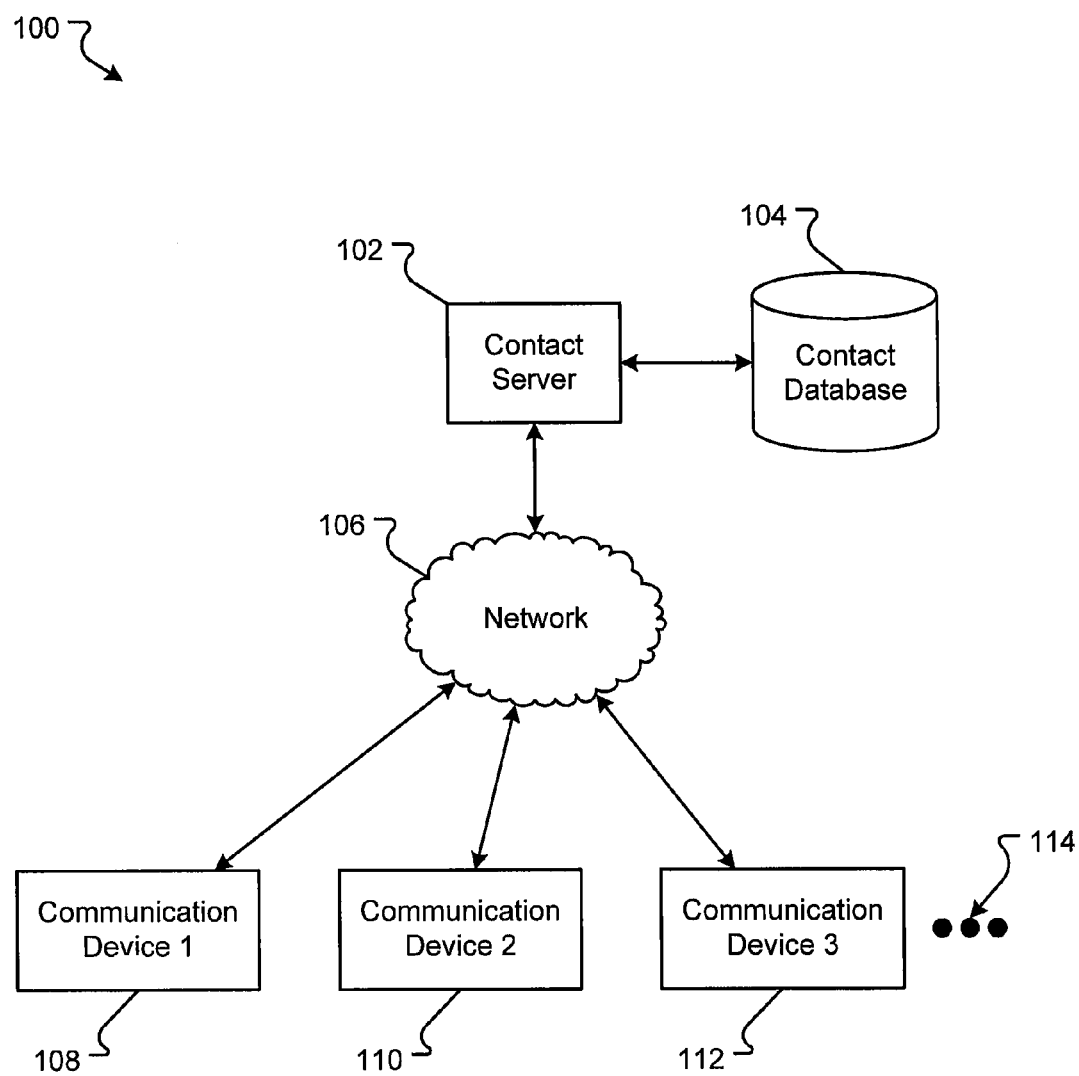
FIG. 1 is a block diagram of an embodiment of a system for managing and organizing contacts.

An embodiment of the system 100 may be used for organizing and storing contact information as shown in FIG. 1. The system 100 can include a contact server 102, a universal contacts database 104, and communication device 1 108, communication device 2 110, and/or communication device 3 112. The contact server 102 may be hardware, software or combination of hardware or software. The contact server 102 is a computing system as described in conjunction with FIGS. 8 and 9. A contact server 102 can retrieve contact information from communication device 1 108, communication device 2 110 or communication device 3 112. The contact server 102 can then retrieve the contact information in the universal contacts database 104. By retrieving the contact information from the communication devices 108, 110, and/or 112, the contact server 102 is able to centrally store all contact information and provide that contact information to the user regardless of which communication device 108, 110, and/or 112 the user is using.

The contact server 102 may be in communication with communication device 1 108, communication device 2 110, and/or communication device 3 112, through a network 106. The network 106 can be any network or form of communication, as described in conjunction with FIG. 8. "In communication" can be defined as electrically coupling or connecting two or more components of a system through any form of communication using any type of protocol, regardless of whether that form of communication is wired or wireless.

A communication device, such as communication device 1 108, communication device 2 110 or communication device 3 112, may be hardware, software or a combination of hardware and software. A communication device 108, 110, and/or 112 can be a mobile device, personal digital assistant, a wireless laptop, a computer system operating a thin client communication device, a social-networking site, (such as Facebook), a computer system executing an email system or other communication software, a phone system (such as Session Initiation Protocol Device or application) or other types of communication devices. At least one communication device 108, 110, and/or 112 stores contact information for a user. There may be more or fewer communication devices than shown in FIG. 1, as represented by ellipses 114.

Figure 2:
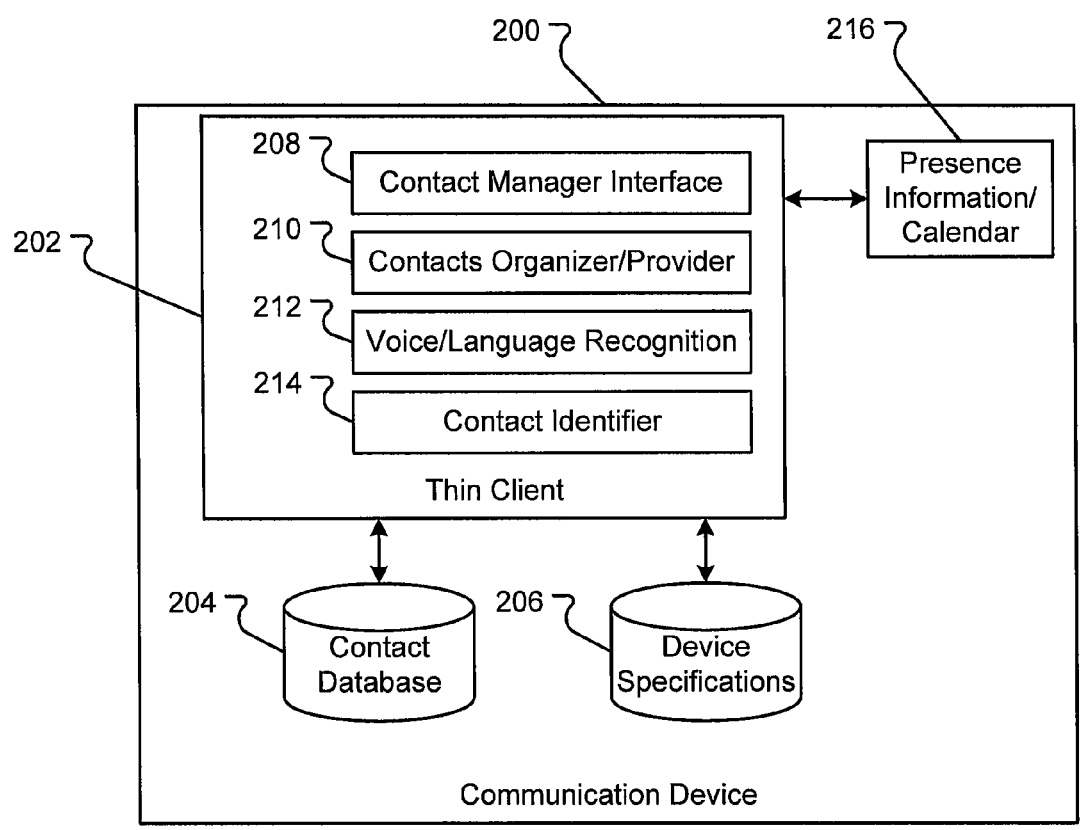
FIG. 2 is a block diagram of an embodiment of a communication device including a thin client for organizing contact information.

The universal contacts database 104 can be any data structure, data store or other system for storing contact information. The universal contacts database 104 may be similar to or the same as the database(s) described in conjunction with FIG. 8. The universal contacts database 104 may be hardware, software, or a combination of hardware and software. For example, the universal contacts database 104 may be a database application that is executed on a data storage system that it is communication with the contact server 102. In other embodiments, the universal contacts database 104 may be a component of the contact server 102. An embodiment of a communication device 200 is shown in FIG. 2. Communication device 200 may be the same or similar to communication device 1 108, communication device 2 110, and/or communication device 3 112, as shown in FIG. 1. The communication device 108, 110, and/or 112 may include a processor memory as described in conjunction with FIG. 9, that are able to execute one or more modules as shown in FIG. 2. However, in some embodiments the modules as described in conjunction with FIG. 2, may be logic circuits that are encoded in an application specific integrated circuit (ASIC), a field programmable gate array (FPGA), or other type of hardware device. The modules will be described as if they are software applications executed in a hardware communication device, but one skilled in the art will understand that these modules may be replaced with a hardware device.

The communication device 200 of FIG. 2 can include a contact database 204 that it is associated with an application that stores contact information within the communication device 200. Further, the communication device 200 can include device specifications that may be stored in a data store or memory 206. The device specifications data store 206 include one or more items of information describing the communication device 200 and how the communication device 200 operates or what the capabilities the communication device 200 may be.

When the user decides to store contact information with the contact server 102, the user may contact the contact server 102 and download a thin client application 202. The thin client application 202 is a small footprint application that requires less storage and less processing capability than other contact information systems or databases. The thin client application 202 can include one or more different modules. The thin client application 202 includes a contact manager interface 208, a contacts organizer/provider 210, a voice/language recognition module 212, and a contact identifier 214. A contact manager interface 208 is a module that is operable to communicate with the contact server 102. The contact manager interface 208 may communicate with the communication device interface 302, 304, and/or 306 described in conjunction with FIG. 3. Contact manager interface 208 is operable to format, modify, and create data packets that can be sent to the contact server 102. Further, the contact manager interface 208 can receive contact information from the contact server 102.

Figure 3:
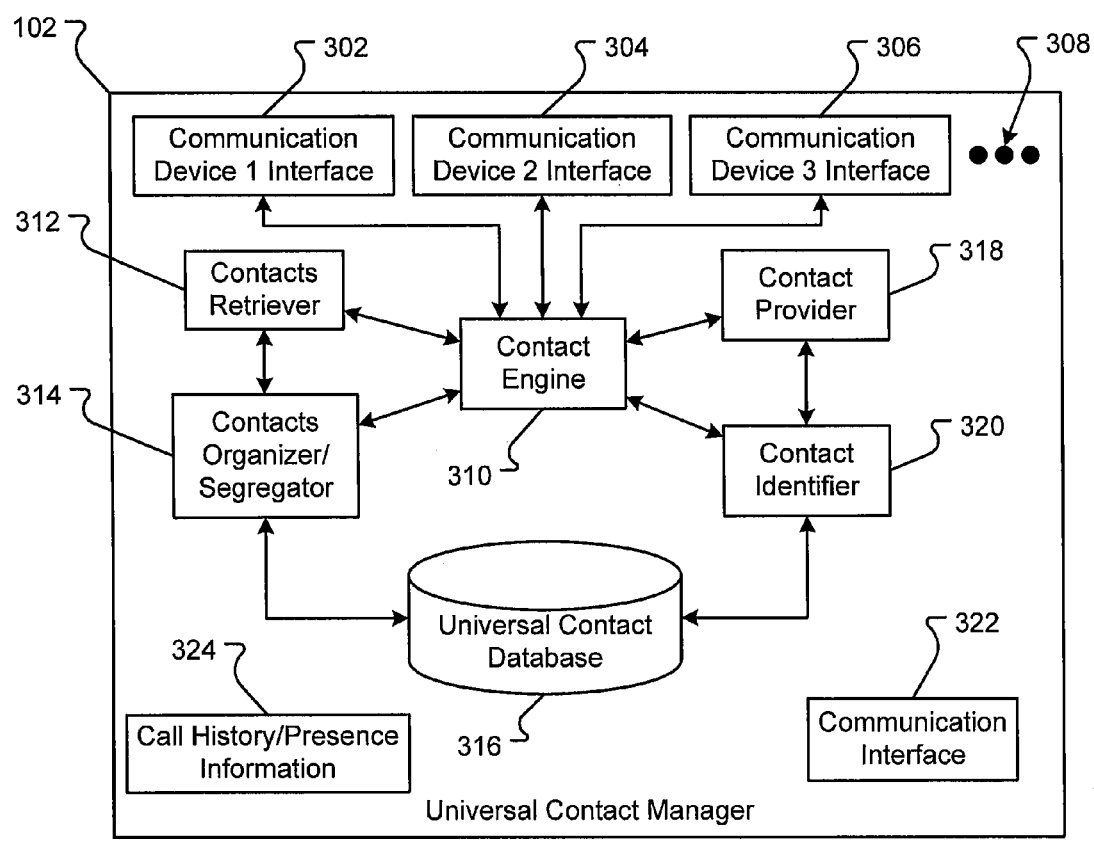
FIG. 3 is a block diagram of an embodiment of a universal contact server, also called a contact server, that is operable to store and organize contact information for user.

Contacts organizer/provider 210 is a module that can provide contact information to the contacts retriever 312, as described in conjunction with FIG. 3. The contacts organizer/provider 210 may also receive contact information from the contact manager interface 208 that is sent from the contact server 102. The contacts organizer/provider 210 then can organize this information into the contact database 204 or provide that information to the user through a user interface as described in conjunction with FIGS. 8 and 9.

The thin client application 202 can also include a voice/language recognition module 212 that can be in communication with the contact database 204. The voice/language recognition module 212 can receive a user's voice signal from a user interface, as described in conjunction with FIGS. 8 and 9. This voice signal may be stored in a contact database 204, as described in conjunction with FIG. 4B. The voice signal stored in the contact database 204 may be matched to a voice signal received from the user interface. The voice signal represents voice recognition data that the voice/language recognition module 212 may use to identify a contact with which the user desires to communicate. After locating the contact in the contact database 204, the voice/language recognition module 212 can provide a contact identity to a contact identifier 214.

A contact identifier 214 can be in communication with a voice/language recognition module 212 to receive an identity of a contact. In other embodiments, a contact identifier 214 can receive information about a contact with which the user wishes to communicate. This received information may be used to determine a contact identity within the contact database 204. The identity may be sent to the contact server 102. The information associated with the contact is provided to the contact manager interface 208 to send to the contact server 102 to provide contact information.

The communication device 200 may also provide presence information or calendar information. The presence information module 216 may provide information about the location or the function of the user at a predetermined time period. For example, the presence information may indicate that the user is currently in a meeting at their workplace. The calendar application also provides information, such as tasks that need to be executed or meetings that the user may need to attend. The presence/calendar information may be provided to the thin client application 202 so that contact information for a party or an entity may be retrieved from the contact server 102 in anticipation of an upcoming teleconference or other meeting that needs the contact information.

An embodiment of the contact server 102 is shown in FIG. 3. The contact server 102, as shown in FIG. 3, may include a processor and memory, as described in conjunction with FIGS. 8 and 9. As such, the modules or components shown in FIG. 3 may be software modules executed by the processor with instructions that are stored in the memory. However, in some embodiments, the modules may be embodied as logic circuits or other hardware in an ASIC, FGPA or other types of hardware. Regardless, these modules will now be described as software executing within the processor of the contact server 102.

The contact server 102 can include one or more communication device interfaces such as communication device interface 1 302, the communication device 2 304 and communication device 3 306. The contact server 102 can include more or fewer communication device interfaces than those shown in FIG. 3, as represented by ellipses 308. Each communication device interface 302, 304, and/or 306 may be operable to communicate with a different type of communication device 200 or with a specific communication device 200. For example, communication device interface 1 302 may be operable to communication with a cellular telephone while communication device 2 304 may be operable to communicate with an email system executing on a computer system. Each communication device interface 302, 304, and/or 306 may send and receive information from one or more communication devices.

Contact server 102 can include a contacts retriever 312, a contacts organizer/segregator 314, a universal contacts database 316, a contact identifier 320, a contact provider 318, and a contact engine 310. Each of these different modules may be executed to retrieve, organize, store, receive, and send contact information with a communication device 200.

Contacts retriever 312 is a module that may be in communication with the contact engine 310 and/or one or more of the communication device interfaces 302, 304 and/or 306. The contacts retriever 312 is operable to receive contact information for a contact from one or more communication device interfaces 302, 304 and/or 306. The contacts retriever 312 may send requests, or synchronize contacts to any communication device 200, in response to the synchronization signal. The communication device 200 may send one or more items of communication information associated with one or more contacts to the contacts retriever 312. The contacts retriever 312 can collect this information and send the information to the contacts organizer/segregator 314.

The contacts organizer/segregator 314 is a module operable to parse the contact information. For example, the contact information received may include more than one data field that can include one or more types of information. The contact information can include the contact's name, the contact's address, the contact's email, etc. By parsing the information, the contacts organizer/segregator 314 can store the contact information into the appropriate fields within one or more data structures in the universal contacts database 316. An example of a data structure 400 that may be used to store the contact information is as described in conjunction with FIG. 4A. The contacts organizer/segregator 314 can receive contact information in natural language format. For example, the contacts information may not be stored without any type of identifier, but only listed in a flat file. The contacts organizer/segregator 314 can use heuristics or other type of data recognition software to determine the type of contact information that is provided within the flat file. For example, the contacts organizer/segregator 314 may search for an "@" symbol to determine which of the contact information is an email. Further, the contacts organizer/segregator 314 may search for a set of digits and recognize that as a phone number. The contact organizer/segregator 314, can determine each of the different items of information within the flat file. The contacts organizer/segregator 314 may, in some situations, use the syntax of the flat file to determine what the different piece of information is. For example, the contact organizer/segregator 314 may search for a space, carriage return or semi-colon to determine that there is a different type or set of contact information that follows that syntactic symbol.

The contacts organizer/segregator 314 can also segregate contacts into different categories. A category can be a logical grouping for a contact. For example, a category can be a business contact, a personal contact, or other types or formats of contacts. The contacts organizer/segregator 314 can use metadata or the contact information itself to determine the category to which a contact should be grouped. Metadata can include information about the contact information or the communication device 200, from which the contact information was retrieved. For example, if the contact information was sent from a work phone, then the metadata may show that the contact information is a business contact and should be stored in business contact category. Further, information about the contact information can include information such as the application that sent the contact, such as Facebook or an email system, the time of day the contact was received, the address type of the contact. For example, if the address is a business address the contact may be assigned to a business category.

The time of day information can determine whether the user is sending the contact information from work or home. For example, if the information was sent to the contact server 102 on the weekend, it is more likely that the information is related to a personal contact. The address type similar to the location information can also determine whether the user is sending the contact information from work or home and can be used to identify business contact or personal contacts. After organizing and segregating the contact information, the contacts organizer/segregator 314 can store the contact information in the universal contacts database 316.

The universal contacts database 316 can store one or more items of contact information for one or more contacts. The universal contacts database 316 can store this information, in data structures as described in FIG. 4A. The universal contacts database 316, after storing the contact information can provide the contact information to a contact identifier 320. A contact identifier 320 can use information sent from a communication device 200 to determine the requested contact within the universal contacts database 316. After identifying within the universal contacts database 316, the contact for which the user is interested in, the contact identifier 320 can retrieve the contact information and send this information to a contact provider 318. The contact identifier 320 may use a contact ID or a natural language representation of the contact. For example, a natural language representation can simply be the name of the contact.

In other embodiments, the contact identifier 320 may also include a voice recognition system (similar to the voice/language recognition module 212) that can identify a voice signal stored within the universal contacts database 316. The contact identifier 320 can provide one or more of the items of the contact information to the contact provider 318. The contact provider 318 can determine what contact information to send to a requesting user through the communication device interface 302, 304, and/or 306.

The contact provider 318 can send all the contact information to the requesting user. However, in other embodiments, the contact provider 318 can eliminate one or more items of contact information before sending the contact information to a user. In order to determine what information to send to a communication device 200, the contact provider 318 may receive the device specifications of the communication device 200 that are stored in the device specifications data store 206. The device specifications can include information about the capabilities of the communication device 200. The capabilities may include whether or not there is a user interface display to display a picture or whether the communication device 200 can only show text. Further, the device specifications may determine whether the communication device 200 can store all contact information or only a portion of the contact information in the universal contacts database 316. Depending upon what information is gleamed from the device specifications, the contact provider 318 can provide all or only a portion of the contact information to the communication device 200.

The functions of the communication device interface 302, 304, and/or 306, the contacts retriever 312, the contacts organizer/segregator 314, the contact identifier 320 and the contact provider 318 are organized and managed by a contact engine 310. The contact engine 310 is operable to determine how data is sent between the different components, to retrieve information from the universal contacts database 316 to send the information to a communication device interface 302, 304, and/or 306, or to provide processing capability to one or more of the modules. Further, communications between the modules may be coordinated through the contact engine 310 such that modules only communicate with the contact engine 310.

In further embodiments, the contact server 102 may include a communication interface 322. Communication interface 322 can provide routing and call or communication placement for communications from a communication device 200. For example, a user may contact the contact server 102 in order to retrieve contact information. However, the user may not be able to then use the contact information to complete a communication with the party associated with the contact information. In these situations, the user may request that the contact server 102 to route the communication to the party associated with the contact information. Thus, the contact server 102 may route the call or other communication through the communication interface 322. For example, the contact server 102 may connect the other party in a phone call with the user that requests the contact information. In other embodiments, the communication interface 322 may send an email, an instant message or other type of communication.

The contact server 102 can also include a call history/presence information module 324. The call history/presence information module 324 may store information regarding the call history of the user. Further, the call history/presence information module 324 may store information about the function or location of the user. The presence and/or call history information may be used by the contact provider 318 to further determine what contact information is relevant for the user when a request for contact information is received.

An embodiment of a data structure 400 is shown in FIG. 4A. The data structure 400 can be used by the universal contacts database 316 or 104 to store contact information. The data structure 400 may include one or more fields and there may be more or fewer fields in the data structure 400 as shown in FIG. 4, as represented by ellipses 424. The fields are labeled by a name which may also describe the data that is stored within those fields. The data structure 400 may represent a single contact. Thus, the contact server 102 may store two or more of the data structures 400, wherein each data structure 400 is associated with a single contact.

The data structure 400 includes one or more, of, but are not limited to, the following fields: a contact identifier (ID) 402, a contact name 404, an address 406, a home phone number 408, a work phone number 410, a cell phone number 412, an email address 1 414, an email address 2 416, instant messenger identifier (ID) 418, organizational data 420, and a contact photograph 422. The contact ID 402 can be any type of identifier, such as a globally unique identifier (GUID), that can identify that contact in relation to all other contacts in the universal contacts database 316. The contact ID 402 may be sent from a communication device 200 to the contact server 102 to locate contact information within the universal contacts database 316 associated with the contact ID 402. The contact name 404 can include the first, middle, last name or some portion thereof of the contact. The address field 406 can include the home address, work address or other address for the contact. This address 406 can include a number, a street name, a city, a state, a zip code, an international zip code or other address information. The home phone number data field 408 can include the home phone number for the contact, which may include the area code and the seven digit home phone number and may also include an international dialing code. Similarly, the work phone number data field 410 can include the work phone number, while the cellular phone number data field 412 can include the cellular number for the contact.

Email address 1 414 can include an email address for the contact. The one contact may have several email addresses, for example, a work email address, or a personal email address. Any of the several email addresses may be stored in the email address field 1 414, while other email addresses may be stored in email address 2 416. There may be more or fewer email address fields in each data structure depending upon how many email addresses are associated with the contact.

The instant messenger ID field 418 can include an instant messenger ID 418 for the contact for an instant message system. An instant messenger ID 418 may be similar to an email address in the email address field 414 and/or 416 depending upon the type of the instant message system. There may be other identifiers for social networking sites or other types of sites that may also be stored in data structure 400. Organizational data 420 can include the category or other data about how this contact is to be organized within the universal contacts database 216. For instance, the organizational data 420 may include what category information which this contact is grouped.

The contact photo field 422 may store the digital information for a contact photograph. For example, the photo may be a photograph used in a social networking site or stored in the contact information for a user. The contact photo may also be used to identify a contact by information sent from a communication device 200. For example, the communication device 200 may send a photograph of the person. Using facial recognition software, the photograph may be matched to the contact photo 422 to identify the contact.

An embodiment of a data structure 426, which is stored in a communication device 200, is as shown in FIG. 4B. Communication device 200 can store data structures 400, similar to the contact server 102, for contacts in which the communication device 200 has the information. However, for information that is stored at the contact server 102 and not at the communication device 200, the communication device 200 can store data structure 426 to provide a minimal amount of information that may be used by the communication device 200 to communicate with the contact server 102 about which contact is to be retrieved. Data structure 426 may include more or fewer fields than those shown in FIG. 4B, as represented by ellipses 436. The data structure 426 includes labels that both identify the field and the data within the field.

Data structure 426 can include one or more of but is not limited to, a contact identifier (ID) 428, a contact name 430, voice recognition data 432, and a sent to contact server flag 434. The contact ID 428 can be the same or similar to contact ID 402, as described in conjunction with FIG. 4A. The contact ID 428 can include a GUID or other identifier that uniquely identifies this contact in relation to all other contacts stored in the contact database 204. The contact name field 430 can include the name of the contact and may be the same or similar to the contact name 404 stored in data structure 400. The contact name 430 can also be used to identify the contact.

Voice recognition data 432 can include a voice signal which may be received from the user to identify a contact specifically. For example, if the contact name is John Smith, the user may say, "John Smith" into the communication device 200. The recording of the name John Smith may be stored in the voice recognition data 230. When the user wants to retrieve contact information for John Smith, they may then repeat the saying of "John Smith" to the communication device 200, in which case the communication device 200 can match that voice signal with the voice recognition data 432 to determine the contact ID 428.

The data structure 426 may also include a sent to contact server flag 434 that is placed in the data structure 426 if this contact has been sent or stored at the contact server 102. For example, if the communication device 200 includes a data structure similar to data structure 400 for a contact and that data is synchronized with the contact server 102, most of the data in data structure 400 can be erased or replaced by a sent to contact server flag 434. The sent to contact server flag 434 recognizes that the data for the contact is stored in the contact server 102. The communication device 200 can retrieve that information from the universal contacts database 316.

Figure 5A:
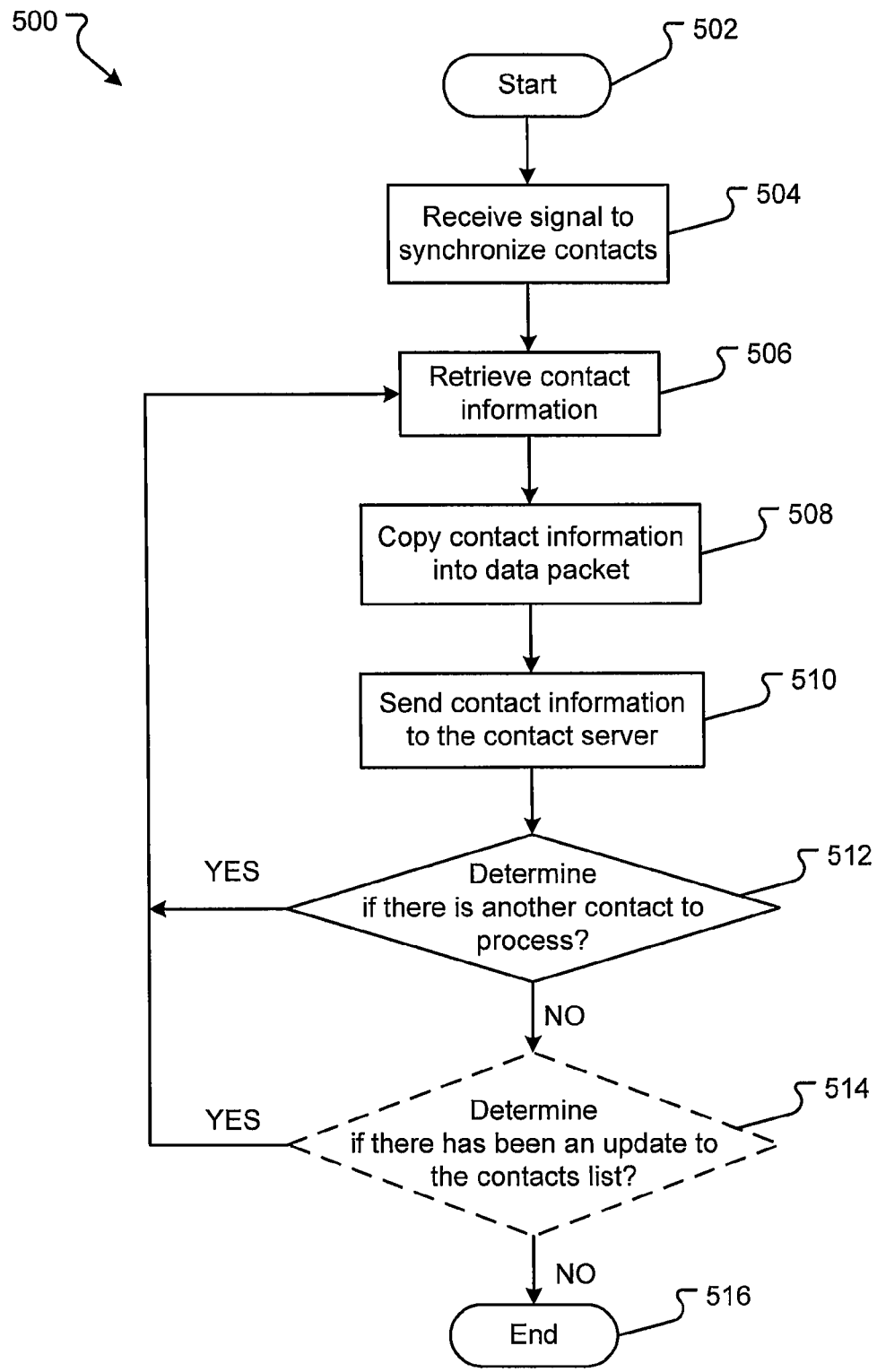
FIG. 5A is a flow diagram of an embodiment of a process for retrieving and storing contact information in the contact server.
Figure 5B:
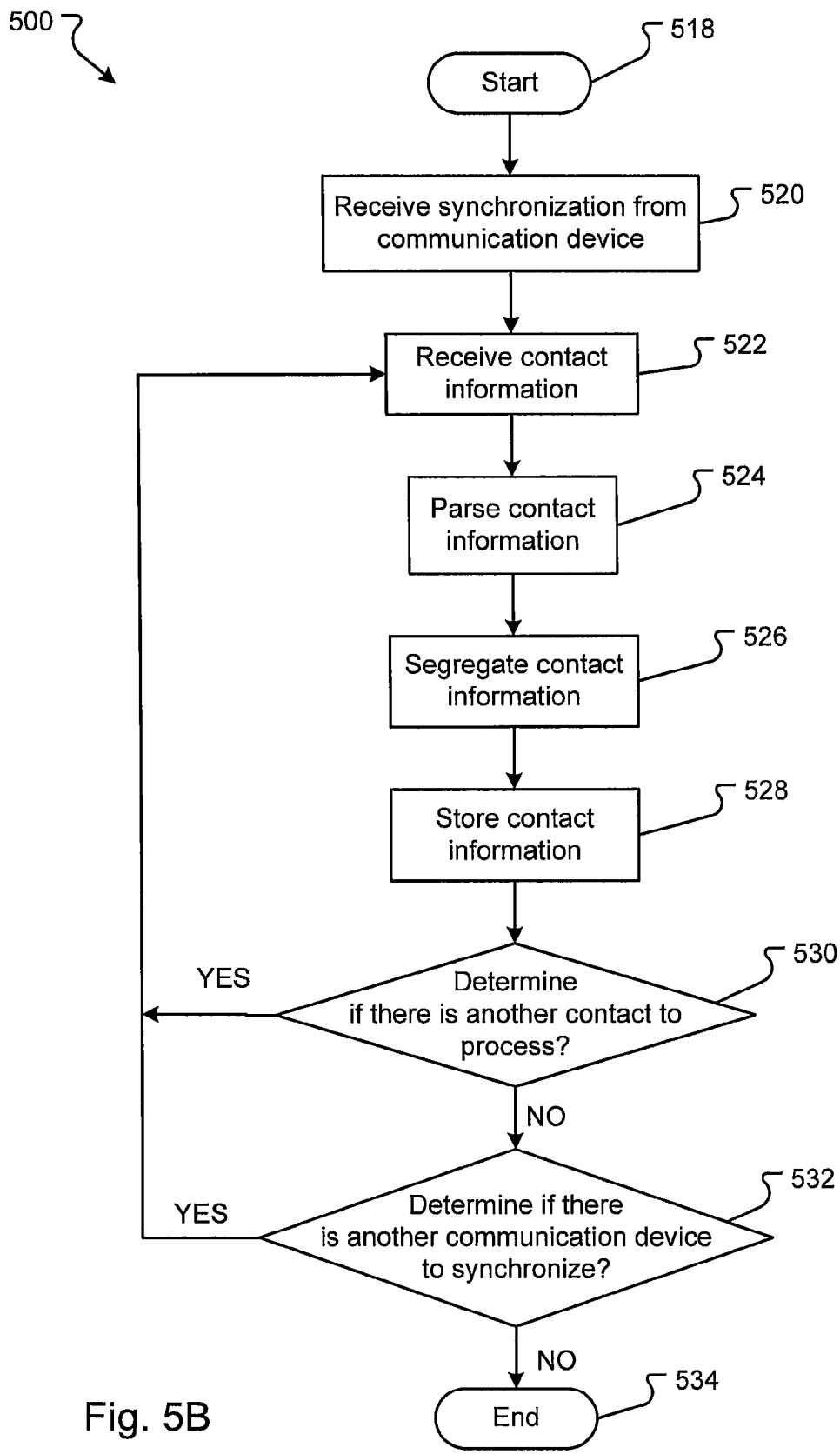
FIG. 5B is a block diagram of an embodiment of a process for storing and organizing contact information in a universal contacts database.

FIG. 5A describes a process for storing contact information at a contact server 102, from the perspective of a communication device 200; FIG. 5B describes the same process from the perspective of the contact server 102. Generally, the method 500 begins with a start operation 502 and terminates with an end operation 516. While a general order for the steps of the method 500 are shown in FIG. 5A, the method 500 can include more or fewer steps or arrange the order of the steps differently than those shown in FIG. 5A. The method 500 can be executed as a set of computer-executable instructions executed by a computer system and encoded or stored on a computer readable medium. Hereinafter, the method 500 shall be explained with reference to the systems, components, modules, software, data structures, etc. described in conjunction with FIGS. 1-4B.

The communication device 200 receives a signal to synchronize contacts with a contact server 102, in step 504. A user interface of the communication device 200, as described in FIGS. 8 and 9 may receive a user interface signal, which may be sent to the contact manager interface 208. The signal may represent a request from the user to synchronize contact information in the contact database 204 with the contact server 102. The synchronization signal may also be sent to the contact server 102 to begin synchronization.

The user may request the contact server 102 to synchronize the contacts. In this instance, the synchronization signal may be sent from the contact server 102 to the communication device 200. In that situation, the synchronization signal may be followed by the download of the thin client application 202. The contacts organizer/provider 210 can then retrieve contact information from the contact database 204, in step 506. The contact organizer/provider 210 retrieves a single contact and the contact information associated therewith. The single contact is copied by the contacts organizer/provider 210 and placed into a data packet, in step 508.

In other embodiments, the contact information is sent to the contact manager interface 208 which then copies the contact information into a data packet. The contact manager interface 208 then sends the data packet with the contact information to the contact server 102, in step 510. The contact manager interface 208 may then send the contact information data packet to a communication device interface 302, 304, and/or 306. After processing, the communication device 200 may then determine if there is another contact to process within the contact database 204, in step 512. For example, the contact manager interface 208 or the contacts organizer/provider 210 may search the contact database 204 to make sure that the "sent to contact server" flag 434 has been set on all data structures 426 within the contact database 204. If there is a contact that does not have this sent to contact server flag 434 set, then there is another contact process.

The contacts organizer/provider 210 can determine or "dirty" the data structure 426 to show that this information has been sent to the contact server 102. If there is another contact to process, the method 500 flows "YES" back to step 506 to retrieve that contact information. In contrast, if there is no other contact to process, the method 500 flows "NO" to optional step 514. After all the contacts have been processed, and if some time has past, it is possible that the user has updated either their own contact information within the contact database 204 or other information regarding a contact in the contact database 204. The contact organizer/provider 210 may organize or look for changes to the contact information and determine if there has been an update to the contacts list, in step 514. These updates can then be automatically sent to the contact server 102 if there has been an update. The method 500 flows "YES" to retrieve contact information, in step 506. If there has not been any updates, the method flows "NO" to end operation 516. As such, any changes are automatically updated in the contact server 102. In FIG. 5B, the contact server 102 can receive the synchronization signal from the communication device 200, in step 520.

Generally, the method 517 begins with a start operation 518 and terminates with an end operation 534. While a general order for the steps of the method 517 are shown in FIG. 5B, the method 500 can include more or fewer steps or arrange the order of the steps differently than those shown in FIG. 5B. The method 517 can be executed as a set of computer-executable instructions executed by a computer system and encoded or stored on a computer readable medium. Hereinafter, the method 517 shall be explained with reference to the systems, components, modules, software, data structures, etc. described in conjunction with FIGS. 1-4B.

In FIG. 5B, the contact server 102 can receive the synchronization signal from the communication device 200, in step 520. In another embodiment, the contact server 102 may initiate synchronization and send the synchronization signal to the communication device 200. The synchronization signal may be an initial request by the user to begin synchronizing contact information from the communication device 200 to the contact server 102. After initializing synchronization, the contact server 102 can receive contact information, in step 522.

The contact information for a single contact is received at the communication device interface 302, 304, and/or 306. The contact information may be sent to the contact engine 310 or directly to the contacts receiver 312. The contacts receiver 312 may parse this contact information 520, in step 524. Parsing the contact information may include separating the different items of contact information into two or more fields. Each of the separate fields may be associated with two or more data structure fields represented in data structure 400. Thus, the parsed contact information can relate to data structure fields, such as the contact name 404, address 406, home phone number 408, work phone number 410, cell phone number 412, email address1 414, possibly email address 2 416, instant messenger ID 418 or contact photo 422. In this way, the contacts retriever 312 can ensure that the contacts organizer/segregator 314 can store the contact information into the correct data field in data structure 400. The contact information may apply to a single contact, however in other embodiments, the communication device 200 may send all contact information to the contacts retriever 312 in a single communication. Contacts retriever 312 may then parse out the contact information into a single set of information for each contact. The contacts retriever 312 then parses out the contact information, in step 524, as explained above.

The contact organizer/segregator 314 receives the parsed contact information and segregates the contact information, in step 526. Contacts organizer/segregator 314 segregates contact information by determining a category for the contact information. The categories can comprise business contacts and personal contacts or some other category that may be specified by the user or may be automatically created by the contacts organizer/segregator 314.

To determine which group to segrate the contact information into, the contacts organizer/segregator 314 may use metadata associated with the contact information or with the communication device 200. The metadata information is as described in FIG. 4A. After segregating the contacts, the contacts organizer/segregator 314 can create organizational data 420 that can be stored in data structure 400. The organizational data 420 can include the group in which the contact is associated. The contacts organizer/segregator 314 can then store the contact information in the universal contacts database 316, in step 528. The data structure 400 with which the contact information is stored, can be the same or similar data structure 400 as described in conjunction with FIG. 4A. After storing the contact information for the contact, the contacts retriever 312 and/or the contacts organizer/segregator 314 can determine if there is another contact to process, in step 530. For example, if the communication device 200 is sending contact information for each contact in separate subsequent communications, then the contacts retriever 312 can determine if the communication device 200 has sent a new set of contact information for a new contact.

In other embodiments, if the communication device 200 has sent all contact information in one single communication, the contacts organizer/segregator 314 may determine if there is another set of contact information for another contact within the group of contacts. If there is another contact to process, the method 500 flows "YES" to step 522. If there is no other contact to process, the method 500 flows "NO" to step 532. In step 532, the contact engine 310 or contacts retriever 312 may determine if there is another communication device 200 with which to synchronize. For example, the user, in some embodiments, provides information about every communication device 200 or application with which the user is associated. In such a situation, the contact server 102 can synchronize contact information with each of these communication devices 200, in turn. As such, after processing all the contact information for first the communication device 108, the contact server 102 may then synchronize all contact information with a second communication device 110. If there is another device to synchronize, the method 500 flows "YES" back to step 522 to receive the first of the contact information. If there is no other device to synchronize, the method 500 flows "NO" to end operation 534.

The contact server 102 may also receive updated information associated with step 514 in FIG. 5A. In this case, the contact server 102 can determine if there is an update to a contact in the universal contacts database 316. If there is an update, as received by a communication device 200, for a contact in the universal contacts database 316, the contact server 102 receives the updated contact information from the communication device 200. The contact server 102 then may follow the same process as described in FIG. 5B by parsing the contact information, in step 524, into two or more fields and then storing that information in the universal contacts database 316. However, unlike the processes described in FIG. 5B, only the updated contact information may be stored in the universal contacts database 316. As such, only those fields that need updating are stored or parsed. If an update is received, one or more other users not associated with communication device 200 may subscribe to the contact server 102 to receive these updates. For example, a user may update their own contact information. Other entities or users may subscribe to the contact server 102 to receive these updates of the user's information, if the updates occur. As such, if an update does occur, the updated contact information may be sent to another user that has subscribed to the contact server 102 for updates to the contact information.

Figure 6A:
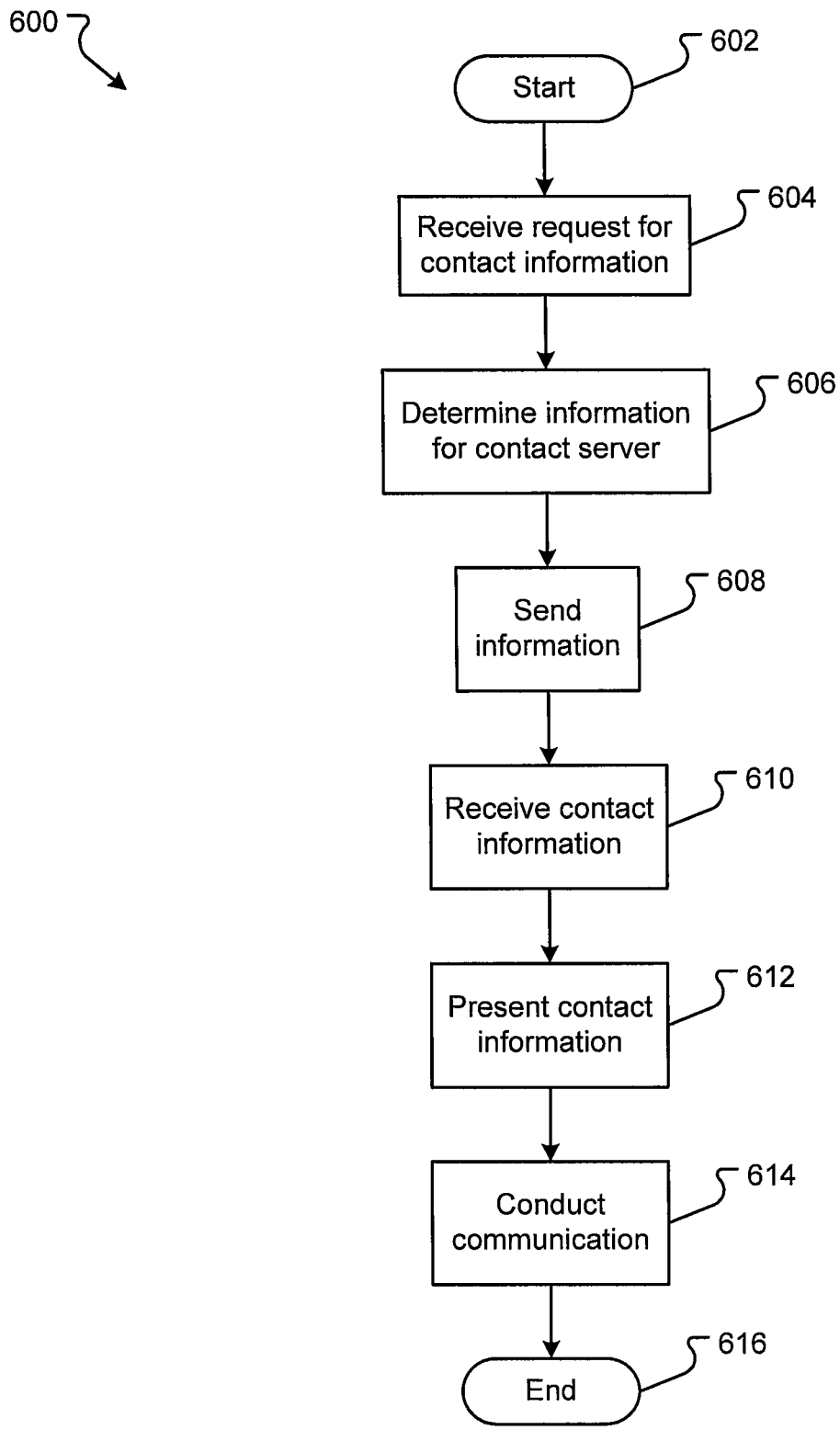
FIGS. 6A and 6B are block diagrams of embodiments of processes for retrieving contact information from the universal contacts database for a communication device.
Figure 6B:
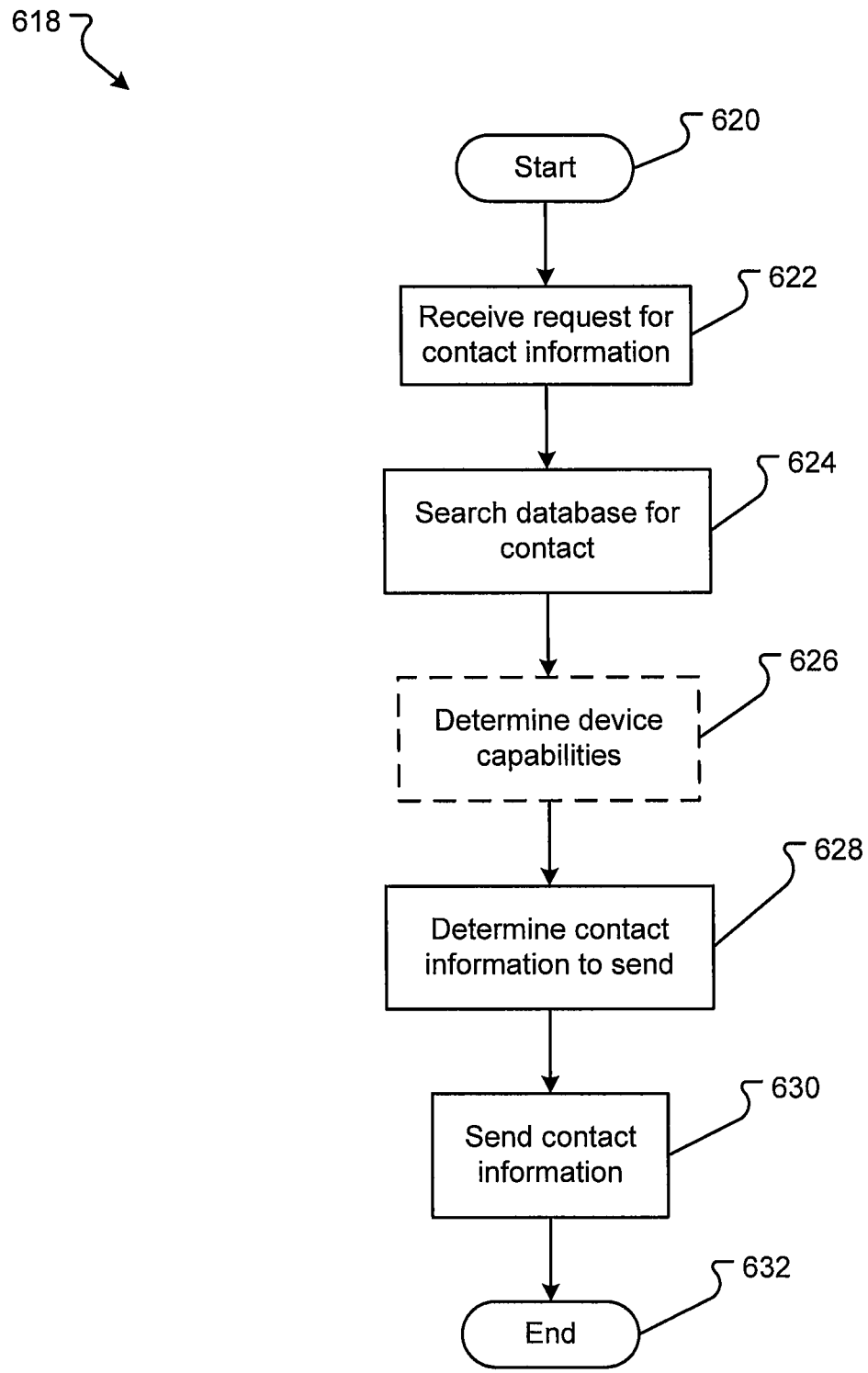

The processes 600 and 618 for retrieving contact information from the universal contacts database 316, at a contact server 102, is as described in conjunction with FIGS. 6A and 6B. FIG. 6A is a process described from the prospective of a communication device 200, while FIG. 6B is the process 618 described from the prospective of the contact server 102. Communication device 200 can receive requests from a user in a user interface device, as described in conjunction with FIG. 9, for contact information, in step 604. The request for contact information may include some identifying information or a voice signal that is associated with the contact. The voice/language recognition module 212 or contact identifier 214 determines information to the contact server 102 to send to retrieve the contact information, in step 606.

The voice/language recognition module 212 can receive a voice signal and search the contact database 204 for a matching voice signal. The voice/language recognition module 212 searches the voice recognition data 432 in one or more data structures 426. If there is a match with voice recognition data 432, the voice/language recognition module 212 may read the contact ID 428. The contact ID 428 may be sent to contact identifier 214, in step 608.

In other embodiments, the user may type in or provide a contact name 430, the contact ID 428, or some other information that may identify the contact in the data structure 426. The contact identifier 214 may then send the contact ID 428, contact name 430, or some other type of information to the contact server 102 to retrieve the contact information. At some point thereinafter, the contact server 102 sends the contact information back to the communication device 200 which receives the contact information, in step 610.

The contact identifier 214 receives the contact information. Thereinafter, the contact identifier 214 can send the contact information to the user interface device, in step 612. For example, the contact identifier 214 can provide a user interface display that shows the contact phone number or other information on the user interface display or has a computer generated voice module that will state the contact information over a speaker or some other user interface device. The contact identifier 214 can also send this information to the communication application or system to allow the communication device 200 to conduct the communication in step 614.

The contact server 102 receives the contact information from the contact identifier 214, in step 622. The contact identifier 214 sends the contact information to communication device interface 302, 304, and/or 306. The communication device interface 302, 304, and/or 306 may send the contact information to a contact engine 310 or to a contact identifier 320. Regardless, the contact identifier 320 can search the universal contacts database 316, in step 624.

The contact identifier 320 uses the contact ID 428, contact name 430 or other information received to search data structure 400 for similar or the same information. For example, if the contact identifier 320 receives a contact ID 428, a contact identifier 320 searches for the same contact ID in the contact ID field 402. Upon locating the information sent from the contact identifier 214, the contact identifier 320 sends the contact information in data structure 400 to the contact provider 318.

In an optional step, the contact provider 318 receives the device specifications from the communication device 200 that are stored in the device specification data store 206. The device specifications data store 206 are used by the contact provider 318 to determine the device capabilities, in step 626. For example, if the communication device 200 does not have a display screen, then the contact provider 318 will not send photo data stored in the contact photo field 422. Further information may be culled from the data structure 400 and not sent to the communication device 200 depending upon the device or the application's capabilities. For example, the contact provider 318 would not send cell phone numbers to an email application. The contact provider 318 may not send email addresses to an instant message system, and may not send addresses to a cell phone.

One skilled in the art will be able to discern other ways of culling information from data structure 400 before sending that information to the communication device 200 depending on the capabilities that the communication device 200 or the application being executed by the communication device 200. Regardless, the contact provider 318 determines what contact information to send to communication device 200, in step 628. After determining the contact information, to send to the communication device 200, the contact provider 318 through the contact engine 310 sends the contact information and/or communication device interface 302, 304, and/or 306 to the communication device 200, in step 630.

Figure 7:
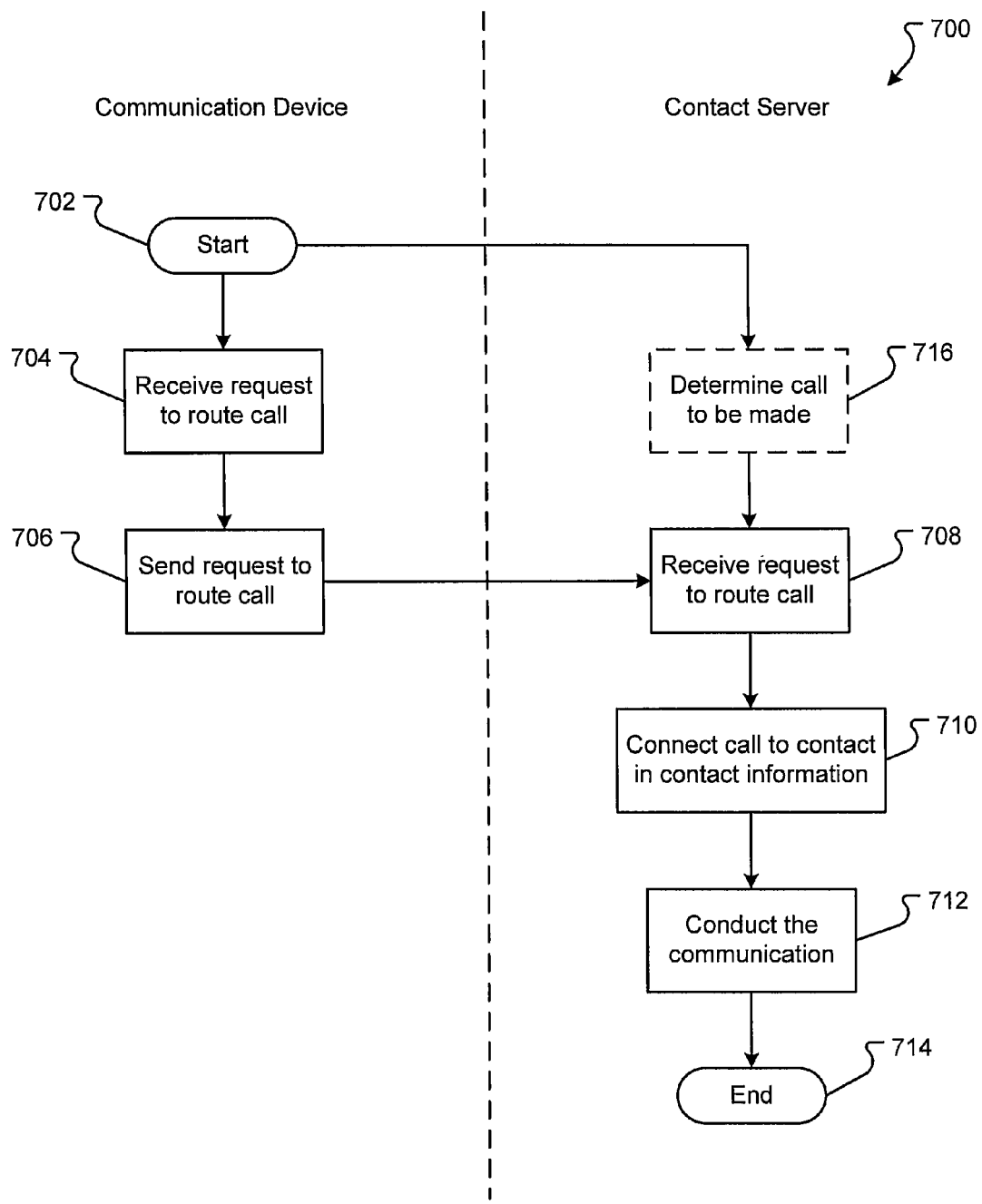
FIG. 7 is a flow diagram of an embodiment of a process for routing a call through a universal contact server.

Any embodiment of a method 700 of conducting a communication with relation to contact information as shown in FIG. 7. Generally, the method 700 begins with a start operation 702 and terminates with an end operation 714. While a general order for the steps of the method 700 are shown in FIG. 7, the method 700 can include more or fewer steps or arrange the order of the steps differently than those shown in FIG. 7. The method 700 can be executed as a set of computer-executable instructions executed by a computer system and encoded or stored on a computer readable medium. Hereinafter, the method 700 shall be explained with reference to the systems, components, modules, software, data structures, etc. described in conjunction with FIGS. 1-4B. The process shown in FIG. 7 includes steps executed by the communication device 200 and the contact server 102. The different steps are dilineated and separated by line 701.

Either after or in conjunction with a request for contact information received at communication device 200, a receiver requests to route a call. In step 704, the request can request the communication device 200 to request a contact server 102 to complete the communication. In step 706, communication device 200 sends the request to route the call to the contact server 102. The contact server 102 receives the request to route the call, in step 708. The request is sent from the communication device 200 with contact information required to complete the communication. In step 710, the communication interface 322 routes the call to the other party in the contact information. Thereinafter, the communication interface 322 can conduct the communication, in step 712. The communication described in FIG. 7 is a telephone call, however, in other embodiments, the communication can be an instant message, an email, or other communication that may be routed by the contact server 102 to the other party using the contact information stored at the contact server 102.

In further embodiments, the contact server 102 or the communication device 200 may determine if a call needs to be made either presently or in the near future. For example, if a user has made the same call or communication to the same user at the same time over a period of time or frequently made the same call, the communication history may be stored in a call history/presence information module 324 or the presence information/calendar system 216. Further, if the user has an upcoming meeting or other event that requires a communication, a communication device 200 can access that information from the presence information/calendar module 216, or the contact server 102 can access that information from the call history/presence information module 324 to begin the process of determining contact information for the event. Using the same process to retrieve the contact information, communication device 200 or the contact server 102 may use that information as a request to route the call, in step 708.

In other embodiments, the determination of contact information may be presented to the user and the user interface device. For example, the communication device 200 may ask the user if they wish to make the phone call as previously made or that should be made in relation to a calendar event. If the user replies affirmatively, then the call may be routed per FIG. 7.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Figure 8:
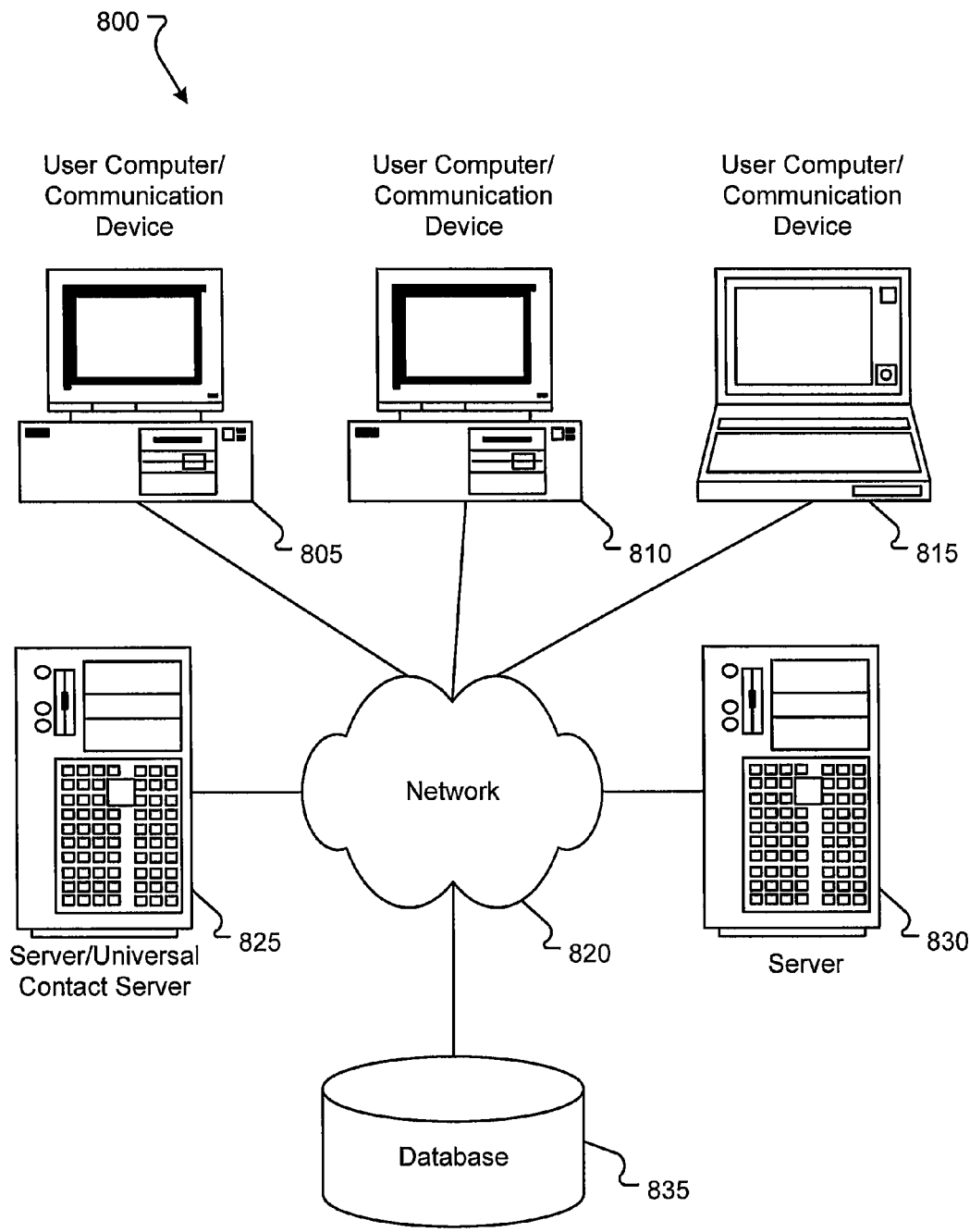
FIG. 8 is a block diagram of an embodiment of a computer environment that may be executed as a system for organizing and storing contact information.

FIG. 8 illustrates a block diagram of a system 800 that may function as servers, computers, or other systems provided herein. The system 800 includes one or more user computers 805, 810, and 815. The user computers 805, 810, and 815 may be general purpose personal computers (including, merely by way of example, personal computers, and/or laptop computers running various versions of Microsoft Corp.'s Windows™ and/or Apple Corp.'s Macintosh™ operating systems) and/or workstation computers running any of a variety of commercially-available UNIX™ or UNIX-like operating systems. These user computers 805, 810, 815 may also have any of a variety of applications, including for example, database client and/or server applications, and web browser applications. Alternatively, the user computers 805, 810, and 815 may be any other electronic device, such as a thin-client computer, Internet-enabled mobile telephone, and/or personal digital assistant, capable of communicating via a network 820 and/or displaying and navigating web pages or other types of electronic documents. Although the exemplary system 800 is shown with three user computers, any number of user computers may be supported.

System 800 further includes a network 820. The network 820 may can be any type of network familiar to those skilled in the art that can support data communications using any of a variety of commercially-available protocols, including without limitation SIP, TCP/IP, SNA, IPX, AppleTalk, and the like. Merely by way of example, the network 820 may be a local area network ("LAN"), such as an Ethernet network, a Token-Ring network and/or the like; a wide-area network; a virtual network, including without limitation a virtual private network ("VPN"); the Internet; an intranet; an extranet; a public switched telephone network ("PSTN"); an infra-red network; a wireless network (e.g., a network operating under any of the IEEE 602.11 suite of protocols, the Bluetooth™ protocol known in the art, and/or any other wireless protocol); and/or any combination of these and/or other networks. The network 820 may be the same or similar to network 106.

The system may also include one or more server computers 825, 830. One server may be a web server 825, which may be used to process requests for web pages or other electronic documents from user computers 805, 810, and 820. The web server can be running an operating system including any of those discussed above, as well as any commercially-available server operating systems. The web server 825 can also run a variety of server applications, including SIP servers, HTTP servers, FTP servers, CGI servers, database servers, Java servers, and the like. In some instances, the web server 825 may publish operations available operations as one or more web services.

The system 800 may also include one or more file and or/application servers 830, which can, in addition to an operating system, include one or more applications accessible by a client running on one or more of the user computers 805, 810, 815. The server(s) 830 may be one or more general purpose computers capable of executing programs or scripts in response to the user computers 805, 810 and 815. As one example, the server may execute one or more web applications. The web application may be implemented as one or more scripts or programs written in any programming language, such as Java™, C, C#™, or C++, and/or any scripting language, such as Perl, Python, or TCL, as well as combinations of any programming/scripting languages. The application server(s) 830 may also include database servers, including without limitation those commercially available from Oracle, Microsoft, Sybase™, IBM™ and the like, which can process requests from database clients running on a user computer 805.

The web pages created by the web application server 830 may be forwarded to a user computer 805 via a web server 825. Similarly, the web server 825 may be able to receive web page requests, web services invocations, and/or input data from a user computer 805 and can forward the web page requests and/or input data to the web application server 830. In further embodiments, the server 830 may function as a file server. Although for ease of description, FIG. 6 illustrates a separate web server 825 and file/application server 830, those skilled in the art will recognize that the functions described with respect to servers 825, 830 may be performed by a single server and/or a plurality of specialized servers, depending on implementation-specific needs and parameters. The computer systems 805, 810, and 815, file server 825 and/or application server 830 may function as the system, devices, or components described in FIGS. 1-3. The system 800 may also include a database 835. The database 835 may reside in a variety of locations. By way of example, database 835 may reside on a storage medium local to (and/or resident in) one or more of the computers 805, 810, 815, 825, 830. Alternatively, it may be remote from any or all of the computers 805, 810, 815, 825, 830, and in communication (e.g., via the network 820) with one or more of these. In a particular set of embodiments, the database 835 may reside in a storage-area network ("SAN") familiar to those skilled in the art. Similarly, any necessary files for performing the functions attributed to the computers 805, 810, 815, 825, 830 may be stored locally on the respective computer and/or remotely, as appropriate. In one set of embodiments, the database 835 may be a relational database, such as Oracle 10i™, that is adapted to store, update, and retrieve data in response to SQL-formatted commands.

Figure 9:
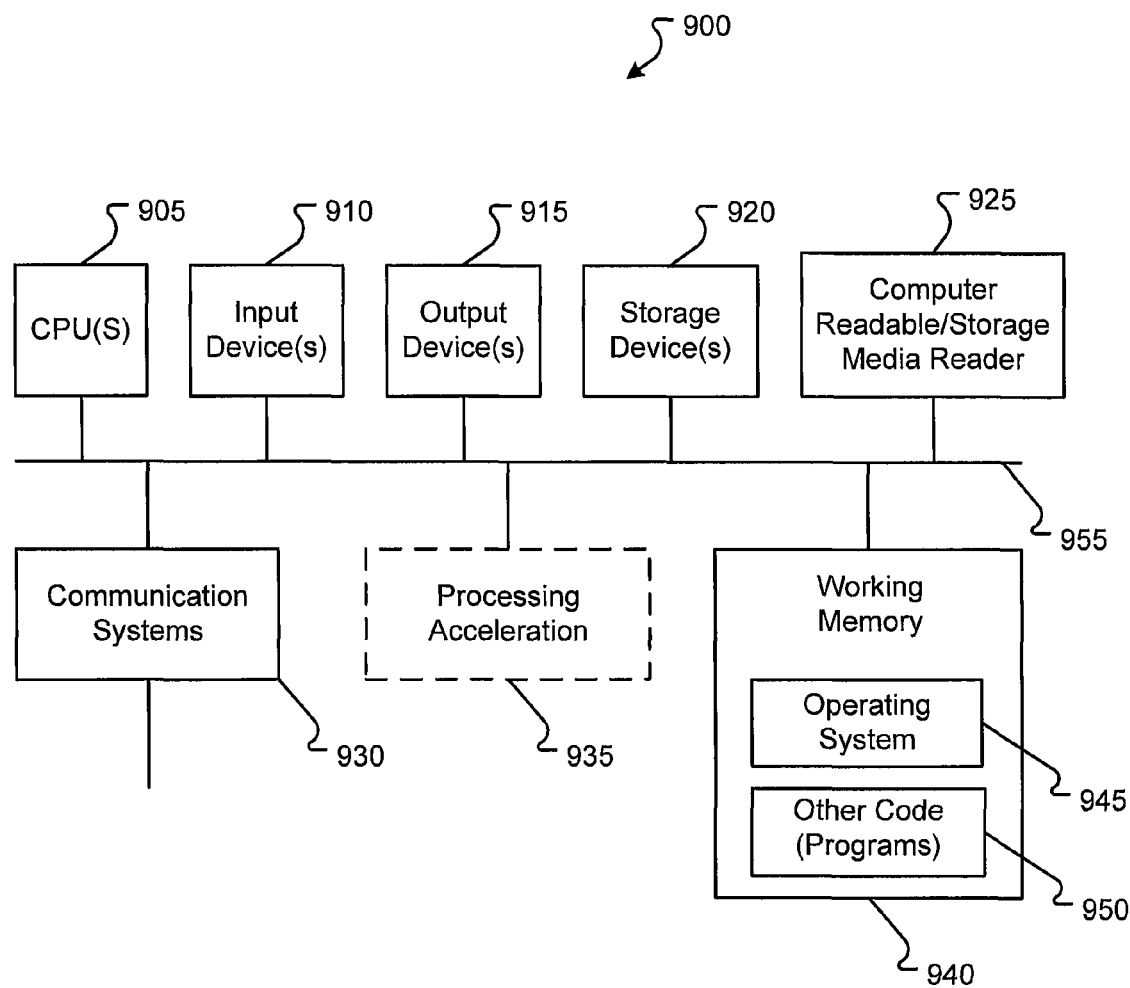
FIG. 9 is a block diagram of an embodiment of a computer system or computing systems which may embody one or more of the components or systems described herein.

FIG. 9 illustrates one embodiment of a computer system 900 upon which the servers, computers, or other systems or components described herein may be deployed or executed. The computer system 900 is shown comprising hardware elements that may be electrically coupled via a bus 955. The hardware elements may include one or more central processing units (CPUs) 905; one or more input devices 910 (e.g., a mouse, a keyboard, etc.); and one or more output devices 915 (e.g., a display device, a printer, etc.). The computer system 900 may also include one or more storage devices 920. By way of example, storage device(s) 920 may be disk drives, optical storage devices, solid-state storage devices such as a random access memory ("RAM") and/or a read-only memory ("ROM"), which can be programmable, flash-updateable and/or the like.

The computer system 900 may additionally include a computer-readable storage media reader 925; a communications system 930 (e.g., a modem, a network card (wireless or wired), an infra-red communication device, etc.); and working memory 940, which may include RAM and ROM devices as described above. In some embodiments, the computer system 900 may also include a processing acceleration unit 735, which can include a DSP, a special-purpose processor, and/or the like.

The computer-readable storage media reader 925 can further be connected to a computer-readable storage medium, together (and, optionally, in combination with storage device(s) 920) comprehensively representing remote, local, fixed, and/or removable storage devices plus storage media for temporarily and/or more permanently containing computer-readable information. The communications system 930 may permit data to be exchanged with the network 920 and/or any other computer described above with respect to the system 900. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 900 may also comprise software elements, shown as being currently located within a working memory 940, including an operating system 945 and/or other code 950. It should be appreciated that alternate embodiments of a computer system 900 may have numerous variations from that described above. For example, customized hardware might also be used and/or particular elements might be implemented in hardware, software (including portable software, such as applets), or both. Further, connection to other computing devices such as network input/output devices may be employed.

In the foregoing description, for the purposes of illustration, methods were described in a particular order. It should be appreciated that in alternate embodiments, the methods may be performed in a different order than that described. It should also be appreciated that the methods described above may be performed by hardware components or may be embodied in sequences of machine-executable instructions, which may be used to cause a machine, such as a general-purpose or special-purpose processor or logic circuits programmed with the instructions to perform the methods. These machine-executable instructions may be stored on one or more machine readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

Specific details were given in the description to provide a thorough understanding of the embodiments. However, it will be understood by one of ordinary skill in the art that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Also, it is noted that the embodiments were described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, firmware, middleware, microcode, hardware description languages, or any combination thereof. When implemented in software, firmware, middleware or microcode, the program code or code segments to perform the necessary tasks may be stored in a machine readable medium such as storage medium. A processor(s) may perform the necessary tasks. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

While illustrative embodiments of the invention have been described in detail herein, it is to be understood that the inventive concepts may be otherwise variously embodied and employed, and that the appended claims are intended to be construed to include such variations, except as limited by the prior art.

What is claimed is:

1. A method for managing contact information at a contact server, the contact server comprising a processor and memory, the method comprising:
   the contact server receiving a synchronization signal from a first communication device;
   the contact server receiving contact information for a contact from the first communication device;
   the contact server parsing the contact information into two or more fields;
   the contact server automatically segregating the contact into a category wherein automatically segregating the contact into the category comprises:
      determining if a location of a person sending the contact is at home or at work;
      in response to determining that the location of the person sending the contact is at home, identifying the contact as a personal contact; and
      in response to determining the that location of the person sending the contact is at work, identifying the contact as a business contact;
   the contact server storing the contact information into a database, wherein the contact is associated with the category in the database;
   the contact server receiving a request for the contact information from a second communication device, wherein the request comprises at least one item of information about the contact and wherein the first communication device and the second communication device are both owned by a user;
   the contact server searching the database for at least one item of information about the contact;
   upon locating the contact in the database, the contact server determining what contact information to send to the second communication device; and
   the contact server sending the determined contact information to the second communication device.

2. The method as defined in claim 1, wherein the contact is segregated by metadata associated with at least one of the group consisting of the contact and the first communication device.

3. The method as defined in claim 2, wherein the categories comprise business contacts and personal contacts.

4. The method as defined in claim 2, wherein the metadata comprises a type of communication device, an application associated with the contact, a time of day the contact was received, an address type of the contact, a type of communication information received for the contact, and the location of the user when sending the contact information.

5. The method as defined in claim 1, wherein the contact information is stored into a data structure in the database, wherein the two or more fields are associated with two or more data structure fields in the data structure, and wherein the data structure fields comprise a contact identifier, a contact name, an address, a home telephone number, a work phone number, a cell phone number, an email address, an instant messenger identifier, organizational data, and a photo.

6. The method as defined in claim 1, further comprising:
   the contact server determining if there is another contact to process for the first communication device;
   if there is another contact to process for the first communication device, the contact server receiving second contact information for a second contact from the first communication device;
   the contact server parsing the second contact information into two or more fields;
   the contact server automatically segregating the second contact into a second category;
   the contact server storing the second contact information into the database, wherein the second contact is associated with the second category in the database; and
   if there is not another contact to process for the first communication device, the contact server ending the synchronization.

7. The method as defined in claim 6, further comprising:
   the contact server determining if there is an update to a contact in the database;
   if there is an update to a contact in the database, the contact server receiving updated contact information for a third contact from the first communication device;
   the contact server parsing the updated contact information into two or more fields; and
   the contact server storing the updated contact information into the database.

8. The method as defined in claim 7, further comprising the contact server reporting the updated contact information to another user that has subscribed to the contact server for updates to the contact information for the updated contact.

9. The method as defined in claim 1, wherein determining what contact information to send to the second communication device comprises:

the contact server receiving a set of device capabilities for the second communication device; and the contact server selecting a portion of the contact information to send to the second communication device.

10. The method as defined in claim 1, further comprising:
the contact server receiving a request to route a communication session associated with the contact information sent to the second communication device; and
a communication interface of the contact server connecting the second communication device with a third communication device listed in the contact information and associated with the contact.

11. The method of claim 1, wherein automatically segregating the contact into the category further comprises:
determining that the contact was sent from a work phone; and
in response to determining that the contact was sent from a work phone, storing the contact as a business category.

12. The method of claim 1, wherein automatically segregating the contact into the category further comprises:
determining a time of day of the contact; and
in response to determining the time of day of the contact, storing the contact in a personal category if the contact is sent on a weekend.

13. A universal contact server comprising:
a microprocessor; and
a computer readable medium, coupled with the microprocessor and comprising microprocessor readable and executable instructions that cause the microprocessor to execute:
a contacts retriever that retrieves contact information for a contact from the first communication device;
a contacts organizer/segregator that parses the contact information, segregates the contact into a category, and stores the contact information in a universal contacts database, wherein segregating the contact into the category comprises: determining if a location of a person sending the contact is at home or at work, identifying the contact as a personal contact in response to determining that the location of the person sending the contact is at home, and identifying the contact as a business contact in response to determining that the location of the person sending the contact is at work;
a contact identifier that identifies a contact in the universal contacts database requested by a user and retrieves contact information associated with the identified contact; and
a contact provider that determines what contact information to send to the requesting user and sends the determined data to the requesting user, wherein the contact provider determines what contact information to send to the requesting user based on device specifications of a second communication device received from the second communication device, and wherein the first communication device and the second communication device are both owned by the user.

14. The universal contact server as defined in claim 13, wherein the first communication device comprises:
a contact database that stores a contact identity and voice recognition data associated with the contact identity;
a device specifications database that stores the device specifications for the first communication device;
a thin client in communication with the universal contacts database and the device specifications database, the thin client comprising:
a contact manager interface that communicates with a communication interface of the universal contact server;
a contacts organizer/provider that provides contact information to the contacts retriever and receives contact information from the contact provider;
a voice/language recognition module in communication with the universal contacts database, the voice/language recognition module receives a voice signal from a user, searches for a stored voice signal in the voice recognition data substantially similar to the voice signal, and determines the contact identity associated with the stored voice signal; and
a contact identifier that receives the contact identity from the voice/language recognition module and sends the contact identity to the contact manager interface to send to the universal contact server.

15. The universal contact server in claim 13, wherein the contact is segregated by metadata associated with at least one of the group consisting of the contact and the first communication device.

16. The universal contact server as defined in claim 15, wherein the categories comprise business contacts and personal contacts.

17. The universal contact server as defined in claim 15, wherein the metadata comprises a type of communication device, an application associated with the contact, a time of day the contact was received, an address type of the contact, a type of communication information received for the contact, and the location of the user when sending the contact information.

18. The universal contact server as defined in claim 13, wherein the contact information is stored into a data structure in the universal contacts database, wherein the two or more fields are associated with two or more data structure fields in the data structure, and wherein the data structure fields comprise a contact identifier, a contact name, an address, a home telephone number, a work phone number, a cell phone number, an email address, an instant messenger identifier, organizational data, and a photo.

19. The universal contact server as defined in claim 13, wherein:
the contacts organizer/segregator determines if there is another contact to process for the first communication device;
the contracts receiver receives second contact information for a second contact from the first communication device if there is another contact to process for the first communication device;
the contact organizer/segregator parses the second contact information into two or more fields;
the contact organizer/segregator automatically segregates the second contact into a second category;
the contact organizer/segregator stores the second contact information into the universal contacts database, wherein the second contact is associated with the second category in the universal contacts database; and
the contact provider sends the synchronization if there is not another contact to process for the first communication device.

20. The universal contact server as defined in claim 19, wherein:
the contact retriever determines if there is an update to a contact in the universal contacts database;

the contact retriever receiving updates contact information for a third contact from the first communication device if there is an update to a contact in the universal contacts database;
the contact organizer/segregator parses the updated contact information into two or more fields; and
the contact organizer/segregator stores the updated contact information into the universal contacts database.

* * * * *

UNITED STATES PATENT AND TRADEMARK OFFICE
CERTIFICATE OF CORRECTION

Page 1 of 1

PATENT NO. : 9,794,404 B2
APPLICATION NO. : 12/687758
DATED : October 17, 2017
INVENTOR(S) : Mangesh Kale and Anand Paithankar It is certified that error appears in the above-identified patent and that said Letters Patent is hereby corrected as shown below:

In the Claims

At Column 19, Line 60, please delete "the that" and replace with --that the-- therein.

Signed and Sealed this
Sixth Day of February, 2018

Joseph Matal
*Performing the Functions and Duties of the*
*Under Secretary of Commerce for Intellectual Property and*
*Director of the United States Patent and Trademark Office*